United States Patent
Pineiro et al.

(10) Patent No.: US 9,465,580 B2
(45) Date of Patent: Oct. 11, 2016

(54) MATH CIRCUIT FOR ESTIMATING A TRANSCENDENTAL FUNCTION

(75) Inventors: Jose-Alejandro Pineiro, Barcelona (ES); Simon Rubanovich, Haifa (IL); Benny Eitan, Haifa (IL); Amit Gradstein, Haifa (IL); Thomas D. Fletcher, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 13/991,892

(22) PCT Filed: Dec. 21, 2011

(86) PCT No.: PCT/US2011/066628
§ 371 (c)(1),
(2), (4) Date: Jun. 5, 2013

(87) PCT Pub. No.: WO2013/095463
PCT Pub. Date: Jun. 27, 2013

(65) Prior Publication Data
US 2014/0222883 A1    Aug. 7, 2014

(51) Int. Cl.
*G06F 1/03* (2006.01)
*G06F 7/57* (2006.01)
(Continued)

(52) U.S. Cl.
CPC . *G06F 7/57* (2013.01); *G06F 1/02* (2013.01); *G06F 1/03* (2013.01); *G06F 7/544* (2013.01); *G06F 7/552* (2013.01); *G06F 9/30014* (2013.01); *G06F 2101/08* (2013.01); *G06F 2101/10* (2013.01); *G06F 2101/12* (2013.01); *G06F 2207/5521* (2013.01)

(58) Field of Classification Search
CPC .......... G06F 1/02; G06F 7/544; G06F 7/552; G06F 2207/5521; G06F 9/30014; G06F 2101/08; G06F 2101/10; G06F 2101/12; G06F 7/57; G06F 1/03; G06F 1/0307; G06F 1/035; G06F 1/0356
USPC .......................................... 708/200–490, 523
See application file for complete search history.

(56) References Cited

U.S. PATENT DOCUMENTS 5,224,064 A    6/1993 Henry et al.
5,235,535 A *  8/1993 Nakayama .................... 708/440
(Continued)

FOREIGN PATENT DOCUMENTS

CN    1918542 A     2/2007
CN    201449601 U   5/2010

OTHER PUBLICATIONS

PCT International Search Report for PCT Counterpart Application No. PCT/US2011/066628, 3 pgs., (Aug. 27, 2012).
(Continued)

*Primary Examiner* — Chuong D Ngo
(74) *Attorney, Agent, or Firm* — Nicholson De Vos Webster & Elliott LLP

(57) ABSTRACT

A math circuit for computing an estimate of a transcendental function is described. A lookup table storage circuit has stored therein several groups of binary values, where each group of values represents a respective coefficient of a first polynomial that estimates the function to a high precision. A computing circuit uses a portion of a binary value, that is also taken from one of the groups of values, to evaluate a second polynomial that estimates the function to a low precision. Other embodiments are also described and claimed.

19 Claims, 6 Drawing Sheets

(51) Int. Cl.
G06F 1/02 (2006.01)
G06F 7/544 (2006.01)
G06F 7/552 (2006.01)
G06F 9/30 (2006.01)

(56) References Cited

U.S. PATENT DOCUMENTS

| | | | |
|---|---|---|---|
| 7,472,149 B2* | 12/2008 | Endo | 708/270 |
| 2004/0015882 A1 | 1/2004 | Tang | |
| 2005/0203980 A1 | 9/2005 | Harrison et al. | |
| 2011/0153707 A1 | 6/2011 | Ginzburg et al. | |

OTHER PUBLICATIONS

PCT Written Opinion of the International Searching Authority for PCT Counterpart Application No. PCT/US2011/066628, 4 pgs., (Aug. 27, 2012).

PCT Notification concerning Transmittal of International Preliminary Report on Patentability (Chapter I of the Patent Cooperation Treaty) for PCT Counterpart Application No. PCT/US2011/066628, 6 pgs., (Jul. 3, 2014).

Oberman, Stuart F., et al., "A High-Performance Area-Efficient Multifunction Interpolator", Computer Arithmetic, ARITH-17 2005, 17th IEEE Symposium on DOI, 2005.

PiÑeiro, Jose-Alejandro, et al., "High-Speed Function Approximation Using a Minimax Quadratic Interpolator", Computers, IEEE Transactions on DOI, 2005,vol. 54, Issue: 3.

Harrison, John, et al., "The Computation of Transcendental Functions on the IA-64 Architecture", Microprocessor Software Labs, Intel Technology Journal, Intel Corporation, 1999.

Cao, Jun, et al., "High-Performance Architectures for Elementary Function Generation", Computer Arithmetic Proceedings, 15th IEEE Symposium on DOI, 2001.

Das Sarma, Debjit, et al., "Faithful Bipartite ROM Reciprocal Tables", Computer Arithmetic Proceedings of the 12th Symposium on DOI, 1995.

Schulte, Michael, J., et al., "Approximating Elementary Functions with Symmetric Bipartite Tables", Computers, IEEE Transactions on DOI, Aug. 1999,vol. 48, Issue: 8.

Schulte, Michael, J., et al., "Hardware Designs for Exactly Rounded Elementary Functions", Computers, IEEE Transactions on DOI, Aug. 1994, vol. 43, Issue: 8.

Takagi, Naofumi, "Powering by a Table Look-Up and a Multiplication with Operand Modification", Computer Arithmetic Proceedings, 13th IEEE Symposium on DOI, Nov. 1998, Volume: 47, Issue 11.

Tang, Peter Ping Tak, "Table-Lookup Algorithms for Elementary Functions and Their Error Analysis", Computer Arithmetic Proceedings, 10th IEEE Symposium on DOI, 1991.

Chen, Dongdong, "Algorithms and Architectures for Decimal Transcendental Function Computation", Thesis, Department of Electrical and Computer Engineering, University of Saskatchewan, Saskatoon, Saskatchewan, Canada, Jan. 2011.

First Office Action from counterpart Chinese Patent Application No. 201180075241.7 mailed Dec. 17, 2015, 16 pages.

* cited by examiner

US 9,465,580 B2

MATH CIRCUIT FOR ESTIMATING A TRANSCENDENTAL FUNCTION

CROSS-REFERENCE TO RELATED APPLICATIONS

This patent application is a U.S. National Phase Application under 35 U.S.C. §371 of International Application No. PCT/US2011/066628, filed Dec. 21, 2011, entitled MATH CIRCUIT FOR ESTIMATING A TRANSCENDENTAL FUNCTION.

This disclosure relates to microprocessors and other processing devices and, more particularly, to their computation of non-arithmetic or transcendental functions. Other embodiments are also described.

BACKGROUND

Processing devices typically have built-in hardware logic circuitry that can calculate not only basic arithmetic functions (like addition, subtraction, and multiplication) but also non-arithmetic functions such as reciprocal, square root and exponential. The latter are also referred to as transcendental functions. Due to their inherent nature, transcendental functions cannot be directly computed with high precision, but instead have to be estimated to the desired precision, typically by computing a polynomial of sufficiently high order. The complexity of the circuitry required for computing transcendental functions is proportional to the needed precision (number of bits), and can play a large role in the overall cost of high volume manufactured microprocessors, such as those found in consumer electronic devices (e.g., personal computers, video game machines, smart phones) as well as engineering and scientific workstations and server machines. As a result, microprocessor designs (and their associated instructions sets) that are intended for different applications may support different precisions for the same transcendental function.

Application software that contains a first transcendental function instruction that is defined for a first microprocessor family may not run properly on another, second microprocessor family. This may be true even when the minimum precision, in terms of a sufficient number of bits, is available in an instruction for the same transcendental function, defined for the second family. That may be due to the software requiring not just the minimum precision in the result of the instruction, but also a sufficient number of bits of the result to be the same. One possible solution for making the software compatible is to add the hardware circuitry needed for computing the first transcendental function instruction, into the second microprocessor family.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
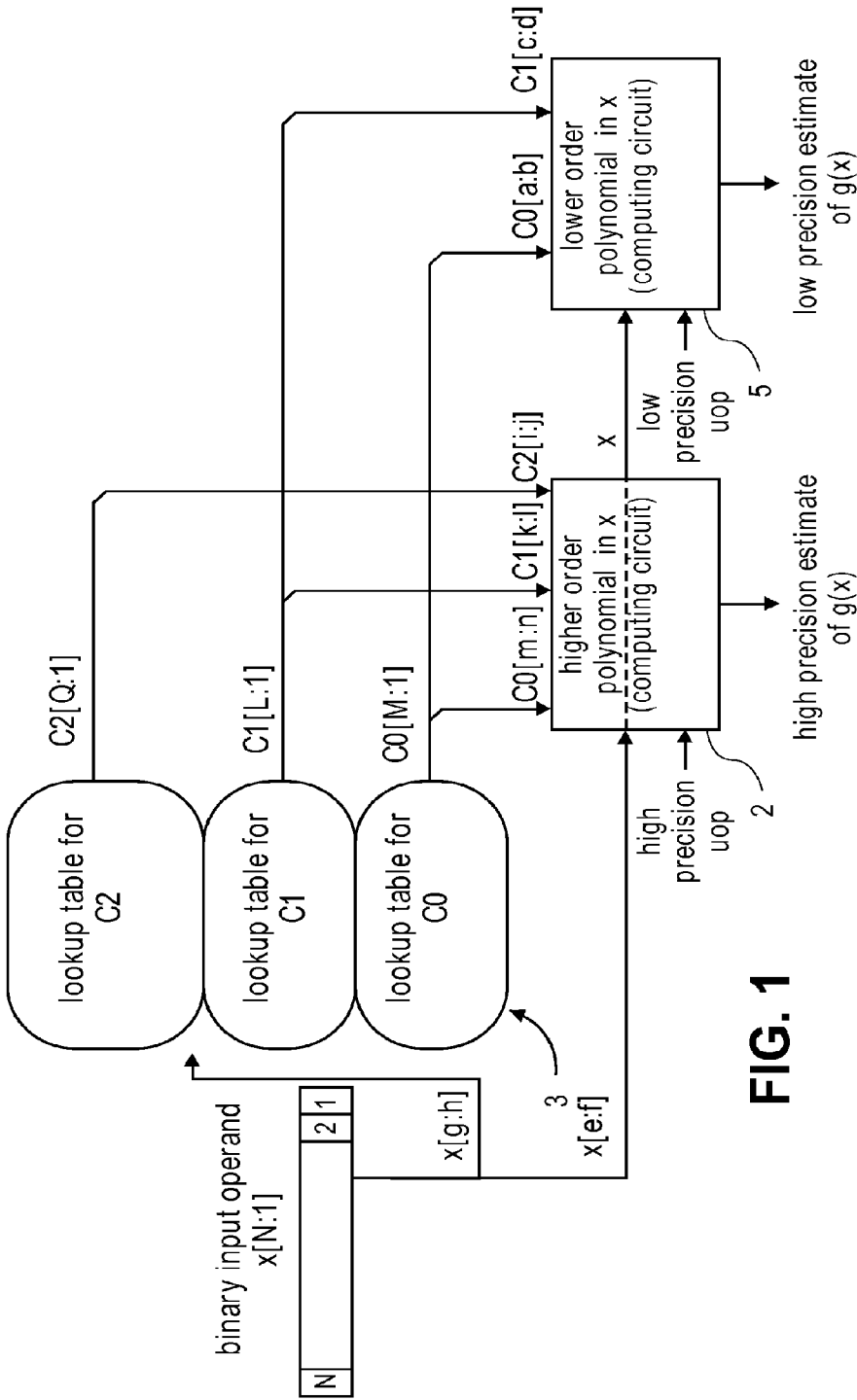
FIG. 1 is a block diagram of a math circuit that can compute a low precision estimate of a transcendental function using a lookup table that can also be used for computing a high precision estimate of the function.

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

As explained in the Background section above, there are situations where a newer microprocessor family is expected to provide hardware level compatibility for processor instructions that are defined as part of the instruction set architecture of an older microprocessor family. A brute force technique to render a given math instruction compatible is to add the hardware circuitry that is needed for computing a "legacy instruction" into the new processor family. With such a technique, however, the new processor family, which may be expected to implement various precisions of a particular math function, is saddled with an increased manufacturing cost, due to significantly more chip real estate being consumed by the added legacy functions. This may be a concern especially with hardware-based computation of non-arithmetic or transcendental functions.

Approximating a transcendental function involves the following three operations: argument reduction to a predetermined input interval; function approximation of the reduced argument; and reconstruction, normalization and rounding of the final result. Typically, hardware based approaches for the function approximation operation in processing devices such as microprocessors, central processing units, graphics processing units, and digital signal processors, use so called non-iterative table lookup based or table driven techniques. There are different types of table-based approaches. At one end of the spectrum, there are methods that use a relatively small lookup table in conjunction with a high degree polynomial approximation, for estimating the particular transcendental function. The high degree polynomial approximation requires a significant number of additions and multiplications in order to produce the estimate. In contrast, at another end of the spectrum, a direct table lookup technique uses very large initial lookup tables combined with very little computation such as at most just a few integer additions. As a balance between those extremes, table-assisted methods are now being used that are based on linear approximations (first order polynomials) and quadratic approximations (second order polynomials). These methods may be used for approximating transcendental functions such as reciprocal, reciprocal square root, logarithm, exponential, and trigonometric functions.

The math circuits described here can perform the function approximation operation to obtain a low precision estimate (which may be required by a legacy instruction) by "reusing" a portion of a lookup table that is for evaluating a high precision estimate (which may be required by a newer instruction). The values in the lookup table were generated to produce the coefficients of a higher order polynomial, needed for computing the high precision estimate. The sharing or reuse of such a lookup table, to produce both the low precision estimate and the high precision estimate, may make more efficient use of chip real estate. In addition, the produced low precision estimate can be made essentially equal (on a per bit basis) to a result that would be produced by a legacy instruction executing on an older processor. To obtain such equality, an adjustment circuit is described that adjusts a value taken from the shared lookup table, which value represents a coefficient of a higher order polynomial. The adjusted value is then used for evaluating the lower order polynomial. These benefits may be achieved without having to duplicate the entirety of the low precision transcendental function hardware of the legacy processor.

FIG. 1 is a block diagram of a math circuit that is to compute a low precision estimate using a lookup table designed to yield a high precision estimate of a transcendental function. Here, it may be presumed that the input argument of the transcendental function has already been reduced to the appropriate interval, depending upon the function to be estimated. f(u) represents the transcendental function, and argument range reduction will yield g(x) where x is now constrained to a predetermined and limited interval, for example, (1, 2). Any suitable argument reduction technique may be used, and may be performed either during pre-execution software compilation, or during runtime within the hardware of a processor device and, in particular, within an instruction execution unit. The block diagram of FIG. 1 thus presumes that the input operand x[N:1] is the reduced argument having N integer bits (e.g., binary bits). In addition, circuitry or techniques for performing the reconstruction, normalization and rounding of the final result of the transcendental function f(u) are not given here.

The block diagram of FIG. 1 shows that a table lookup storage circuit 3 is used to retrieve values that represent the coefficients of a higher order polynomial in x; that polynomial may then be evaluated, for the given instance of the input argument x, by a computing circuit 2. As explained below in an example, the higher order polynomial may be a quadratic or second-degree polynomial that needs coefficients $C_0$, $C_1$, and $C_2$. Computation of this polynomial produces a high precision estimate of the transcendental function, as represented by the argument reduced function g(x) which in most cases will be the same form of transcendental function as f(u). The lookup table storage circuit 3 (also referred to as lookup table 3 ) may be implemented by any suitable technique, e.g. field programmable read only memory. The lookup table 3 in this example has stored therein three groups of values, one for each of the coefficients $C_0$, $C_1$, and $C_2$ of a higher order polynomial. Each group represents a number of instances of a respective coefficient that have been predetermined and stored within the lookup table storage circuit, to be output by the table depending on the input values received by the table 3. The contents of the table 3 may be determined using known techniques, for at least one transcendental function. For a given instance of the input operand x, a number of the more significant bits of the input operand, here represented as x(g:h), are used to consult the lookup table 3, which then returns, in this example, three values representing the coefficients $C_0$, $C_1$, and $C_2$. The values are then used by a polynomial computing circuit 2, to evaluate an instance of the higher order polynomial, which estimates the transcendental function to a high precision. Here, the term "high order" (or "higher order") means at least second order.

Now, the arrangement in FIG. 1 can also compute a low precision estimate of g(x), using a polynomial computing circuit 5, to evaluate a second polynomial in x which is a lower order polynomial, and that estimates the transcendental function to a lower precision. The term "lower order" here means lower than the higher order polynomial that is evaluated by the polynomial computing circuit 2 (when a high precision instruction is to be executed). The two computing circuits 2, 5 in a sense "reuse" or share the lookup table 3 ; as such, a further lookup table that contains the complete set of one or more coefficients needed by the lower order polynomial (in this case, the example is that of a linear or first order polynomial requiring coefficients $C_0$ and $C_1$), is not needed. Such sharing may be achieved here by adjusting a portion of a value taken from the lookup table storage 3, which value in fact represents a coefficient of the higher order polynomial. For instance, if the value is C0[M:1] having M binary bits, the portion to be adjusted may be K=m−n+1 bits, C0[m:n], where of course K<M (K and M are positive integers). In other words, the portion to be adjusted may be a truncated version of the binary value stored in the lookup table. Such an adjustment capability is implied in the polynomial computing circuit 2 shown in FIG. 1, and may be implemented as shown in FIG. 2.

Figure 2:
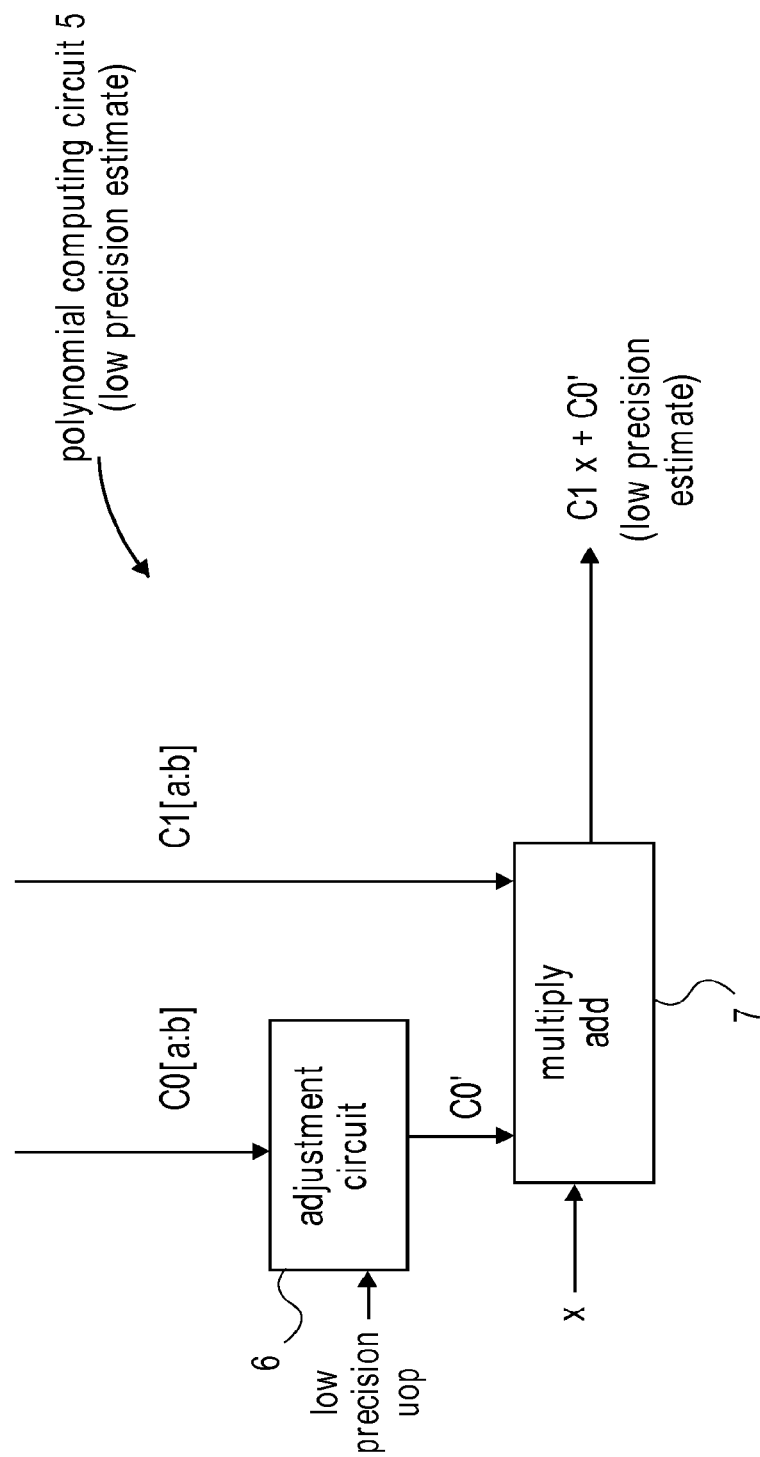
FIG. 2 shows a polynomial computing circuit for producing the low precision estimate.

FIG. 2 shows an example of the polynomial computing circuit 5 for producing the low precision estimate. An adjustment circuit 6 responds to a low precision instruction, which in this case was decoded into a micro-operation (uop), by adjusting its input value. The latter is a portion of the value C0[M:1] that may be output by the lookup table 3. The adjustment circuit 6 thus produces an adjusted value C0', which is an instance of a coefficient of the lower order polynomial. In one example, the adjustment is simply adding an offset value to the input value, where the offset value may vary depending on the input operand x. The adjusted value is then fed to a multiply add circuit 7 which is designed to evaluate the lower order polynomial, in this example a linear polynomial of the form C1x+C0'. Note that in this case, the other coefficient C1 of the lower order polynomial may be obtained directly from the look up table 3, as a portion of the value representing C1[L:1] (e.g., a truncated and rounded version of it). As an alternative, however, the other coefficient could may also be an adjusted version of a portion of C1[L:1]. Remember that C1[L:1] had been predetermined for evaluating the higher polynomial (see FIG. 1).

It should be noted that while FIG. 1 depicts the polynomial computing circuits 2, 5 as separate blocks, they could actually be implemented (in the same execution unit of a processor device) so as to share certain portions. The first and second computing circuits could share a multiply add circuit for evaluating different polynomials. For instance, the same multiply add block could be used to evaluate a linear portion of both the lower and higher polynomials. The computing circuits 2,5 in that case would also include the needed selection logic to provide the common multiply adder with the correct inputs and configuration of carry and save for instance, depending on whether a low precision or a high precision instruction is received. This is where the math circuit can be viewed as having a high precision mode of operation and a low precision mode of operation, in which the estimate of the transcendental function is computed at high precision and at low precision, respectively.

Furthermore, while FIG. 1 depicts a math circuit having both computing circuits 2, 5, the former (higher order polynomial) may be omitted (from the execution unit) when the processor device needs to support only the lower precision transcendental function instruction—see for example FIG. 4 described below which does not show the arithmetic circuits that produce the high precision estimate.

Also, while the lookup table 3 is labeled as providing at its output a coefficient $C_0$ or $C_1$ or $C_2$, this should not be understood as requiring that the lookup table 3 have a storage entry for every single bit of that coefficient. Rather, it may be that for some transcendental functions, one or more bits of a particular coefficient of its polynomial approximation may be implied, e.g. the bit may be constant for all expected combinations of a binary input operand x[g:h], or it may vary predictably (depending on the input argument x), such that a combinational Boolean logic circuit may be sufficient to provide the needed bit more efficiently than allocating a storage entry for those bits within the lookup table 3.

Figure 3:
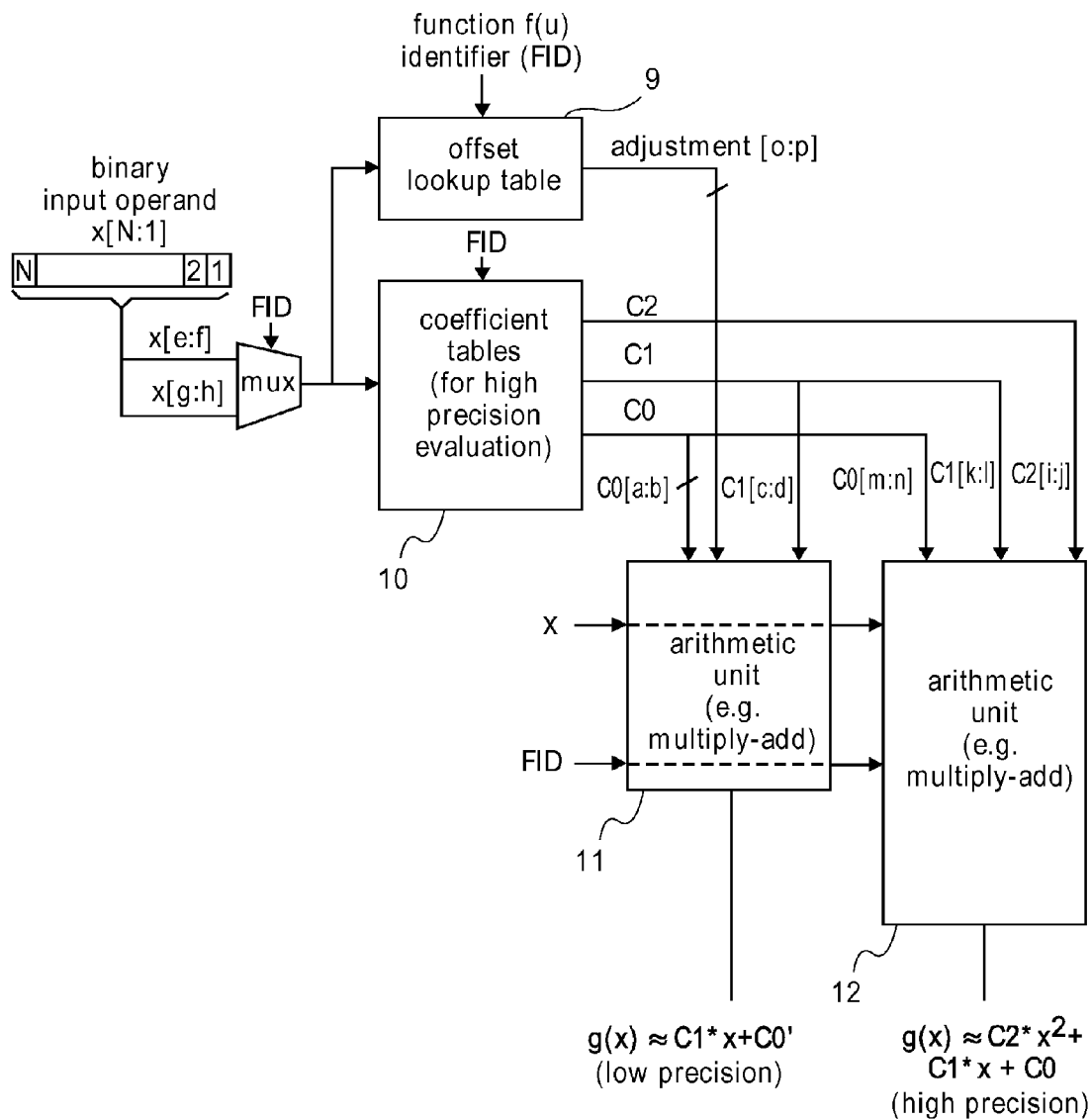
FIG. 3 is a block diagram of a math circuit that can compute a low precision estimate and a high precision estimate using the same lookup table.

FIG. 3 is a block diagram of a math circuit that can compute a low precision estimate and a high precision estimate for more than one transcendental function, using the same group of coefficient lookup tables 10 that are designed for the high precision evaluation. The tables 10 are to be consulted by different portions of the input operand X, depending on the type of transcendental function. A function identifier (FID) indicates the type of function to be estimated, and may be a micro-operation that is produced by decoding a processor instruction. For example, the FID may indicate or distinguish between a reciprocal and a reciprocal of a square root (see FIG. 4 for a detailed block diagram of such a math circuit). Evaluation of the polynomials is achieved by arithmetic units 11, 12 which may be implemented by conventional multiply add logic circuitry. The arithmetic units 11, 12 are configured for operation by the FID and of course receive as input a portion of the input operand x, as dictated by conventional methods. For the low precision evaluation performed by arithmetic unit 11, the value C0[a:b], which is a portion of the value C0 stored in the coefficient lookup tables 10, is added to an offset value, adjustment[o:p], that is obtained from an offset lookup table 9. In this case, the same input value, in this case either x[c:f] or x[g:h] each of which is a portion of the input operand x, is used to simultaneously consult the coefficient tables 10 as well as the offset table 9. The offset values may be predetermined and stored in the lookup table 9.

A method for determining an offset value, adjustment[o:p], that is to be used to adjust a coefficient, for instance C0, is as follows. For a given instance of an input operand x, the transcendental function is estimated, by the legacy instruction running on the legacy processor. The problem now becomes how to determine C0' and C1 so that the lower order polynomial (a low precision estimate evaluated using the shared coefficient tables 10 of the high precision estimate—see FIG. 3), evaluated at the same instance of the input operand x, is essentially equal (on a per bit basis) to the legacy result. An examination of the coefficient tables may reveal that by constraining C1[c:d] (used in the lower order polynomial) to be a truncated version of C1 that is available in the coefficient tables 10 (used in the higher order polynomial), it is possible to achieve a small difference between the legacy result and the new result (over the needed range of input operand x). As seen in the example discussed below, this difference proves to be small relative to the size (number of bits) of the values in the coefficient tables 10, and may be readily computed for most of the respective instances of the index (input to the coefficient tables, which is a portion of input operand x). Each of these computed differences may then be stored as an offset value, in the offset lookup table 9, and associated with each respective instance of the index.

Figure 4:
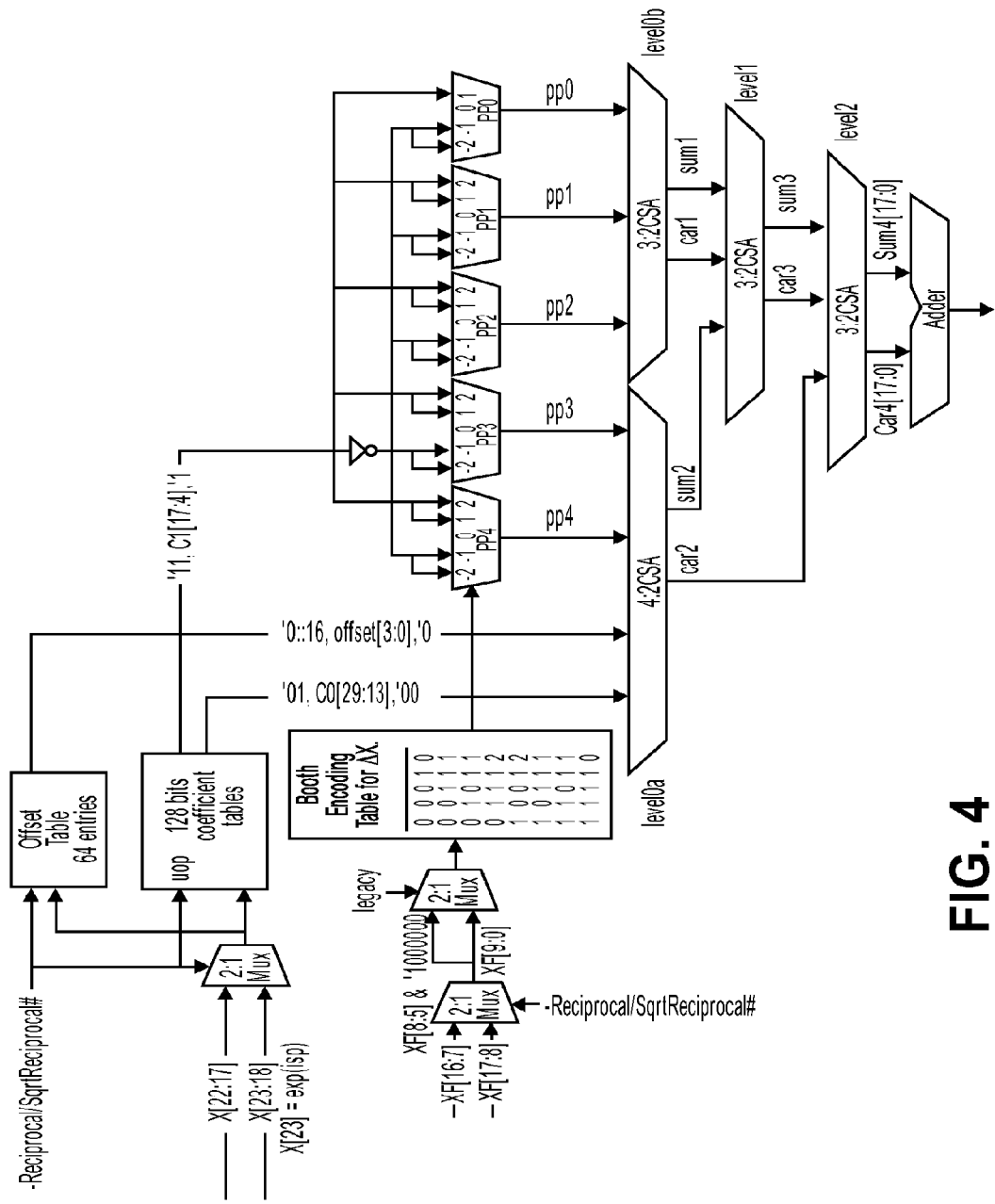
FIG. 4 is a detailed block diagram of a math circuit that is to compute a low precision estimate of a reciprocal function and a square root reciprocal function.

FIG. 4 is a detailed block diagram of a math circuit that is to compute low precision estimates (14 bit binary mantissa in the result) of a reciprocal function and a square root reciprocal function. In this example, the coefficient tables have 128 entries and their index is the upper 7 bits of the input operand x. The coefficient tables in this case are designed for computing a high precision estimate of the reciprocal function (23 bit binary mantissa) using a quadratic polynomial. Based on the guidelines given above for determining an offset table, it was found following some analysis that 16 bits of the C0 values in the coefficient tables are needed, together with 9 bits of the C1 values (and none of the C2 values, of course), for evaluating the linear polynomial so as to yield a small difference, relative to the legacy results. The small differences in this case meant that only 64 entries of 4 binary bits each are needed to represent the offset values for the reciprocal function. With respect to indexing the offset and coefficient tables, in this example the same group of bits of the input operand x are used to index both the coefficient table and the offset table, in particular 6 bits, namely x[22:17] or x[23:18] (depending on whether the function is reciprocal or reciprocal of a square root). It may be however that the analysis reveals that different groups of bits (of the input operand x) should be used for indexing the two tables. As to the arithmetic unit portion of the math circuit, a multiply adder arrangement may be used as shown, which may be a typical fused accumulator tree followed by a carry propagate adder that produces the evaluated polynomial (at the output of the 18-bit adder in this case). Booth encoding may also be used as shown, to quicken the multiplication aspect.

Figure 5:
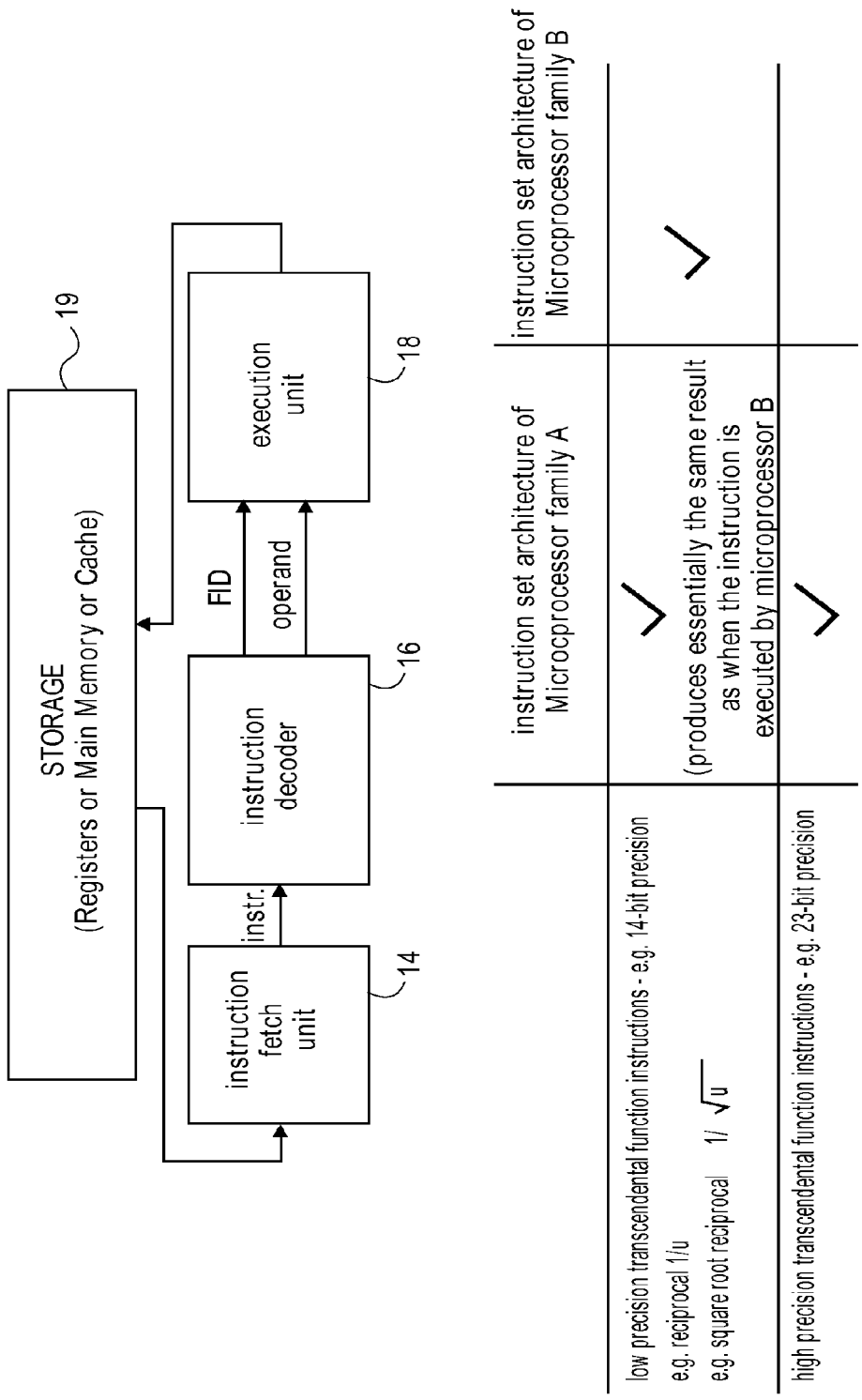
FIG. 5 depicts part of a processor device in which a math circuit can be implemented.

FIG. 5 depicts part of a processor device in which a math circuit as described above can be implemented. The processor device has storage 19 which may be registers, main memory, cache, or any combination thereof, in which instructions to be executed by it, as well as results of the execution of those instructions, may be stored. The storage 19 may be on-chip with an instruction fetch unit 14, an instruction decoder 16, and an execution unit 18. In some case, some of the storage 19 may be off-chip. The instruction fetch unit 14, also referred to as an instruction unit, is responsible for organizing program instructions that are to be fetched or issued from the storage 19 and then executed in the appropriate order. The fetched or issued instruction (e.g., a low precision transcendental function instruction or a high precision transcendental function instruction) is presented to an instruction decoder 16 which interprets the instruction to produce lower level control signals, referred to generically here as micro-operations or uops, that will configure and/or trigger the appropriate logic circuit blocks of the execution unit 18 to process an input argument (also referred to as an operand) of the instruction. In this case, the execution unit 18 detects (from an opcode in the instruction) that a transcendental function is to be computed. The execution unit 18 contains a math circuit that will then be signaled to perform at least a function approximation operation, such as described here, which estimates the detected or identified transcendental function. The ultimate or final result of executing the instruction may then be written to storage 19 (e.g., as part of a typical write-back operation).

The processor device may be capable of performing a machine-implemented method for computing an estimate of a transcendental function, by fetching a low precision instruction that is to evaluate a transcendental function to a low precision. It decodes the instruction and in response accesses a lookup table (e.g., the coefficients tables 10 of FIG. 3, or the lookup table storage circuitry 3 in FIG. 1), to output a value that represents a coefficient of a higher order polynomial that estimates the transcendental function to a high precision. For instance, the lookup table may contain all of the coefficients needed to evaluate the higher order polynomial, to produce a high precision result. A portion of the value output by the lookup table is then adjusted (e.g., by the combination of a separate offset table and arithmetic logic) and a lower order polynomial that estimates the transcendental function to a low precision is then evaluated (using the adjusted value). For example, adjusting the portion of the value output by the lookup table may involve, in response to decoding of the low precision instruction, accessing of a further lookup table to obtain an offset value. The lower order polynomial is then evaluated using the offset value together with the value (output by the lookup table) that represents the coefficient of the higher order polynomial.

The processor device may be an Instruction Set Architecture (ISA) A device, whereas the low precision instruction may have been defined for an ISA B device, yet execution of the low precision instruction on both ISA A and B devices would advantageously produce the same result (while reusing the lookup table which may have been designed for producing a high precision result). The ISA A could also contain a high precision instruction that would use essentially the same lookup table in rendering the high precision result. In that case, the processor device could also perform the following: fetch the high precision instruction (that is to estimate the transcendental function to a high precision); decode the high precision instruction and in response access the same lookup table to obtain several values which represent coefficients of the higher order polynomial; and then evaluate the higher order polynomial using the several values output by the lookup table.

Figure 6:
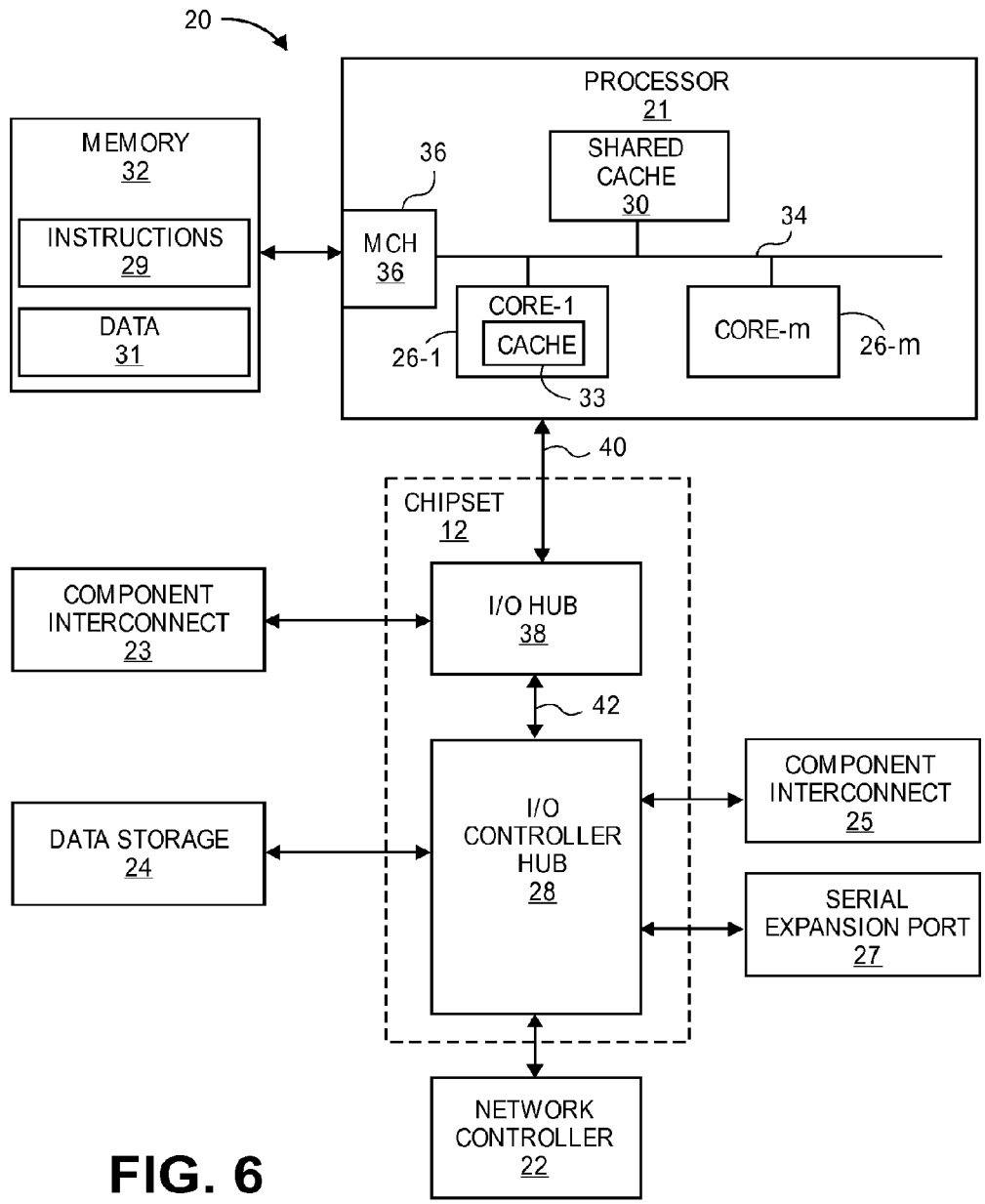
FIG. 6 is a block diagram of an example computer system in which a math circuit is implemented.

Referring now to FIG. 6, a block diagram of a computer system 20 is shown in which a math circuit or a transcendental function execution process can be implemented. The computer system 20 includes a processor 21, and a chipset 12 having an I/O controller hub (ICH) 28. Computer system 20 also includes a first component interconnect 23 coupled with chipset 12, a second component interconnect 25 coupled with the ICH, a serial expansion port 27 coupled with the ICH, a network controller 22 coupled with the ICH, and a data storage 24 coupled with the ICH.

Processor 21 is a multi-core processor and includes processor cores 26-1 through 26-M, where M may be an integer number equal to or larger than two (e.g., two, four, seven, or more). Each core may include at least one execution unit that contains a math circuit, or that can perform a process for executing a transcendental function, as disclosed herein. As shown, the core-1 includes a cache 33 (e.g., an L1 cache). Each of the other cores may similarly include a dedicated cache. The processor cores may be implemented on a single integrated circuit (IC) chip.

The processor 21 also includes at least one shared cache 30. The shared cache may store data (e.g., instructions) that are used by one or more components of the processor, such as the cores. For example, the shared cache may locally cache data stored in a memory 32 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores 26 and the shared cache 30 are each coupled with a bus or other interconnect 34. The bus or other interconnect may couple the cores and the shared cache and allow communication between them and the memory 32.

The processor 21 also includes a memory controller hub (MCH) 36. As shown in this example embodiment, the MCH is integrated with the processor 21. For example, the MCH may be on-die with the processor cores. The processor is coupled with the memory 32 through the MCH. In one or more embodiments, the memory 32 may include DRAM, although this is not required.

The chipset includes an input/output (I/O) hub 38. The I/O hub is coupled with the processor through a bus (e.g., a QuickPath Interconnect (QPI)) or other interconnect 40. The first component interconnect 23 is coupled with the I/O hub 38.

This is just one particular example of a suitable system. Other system designs and configurations known in the art for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, however, as an alternative those operations may be embodied in machine-executable instructions that may be used to cause, or at least result in, a circuit or hardware programmed with the instructions to perform the operations. The circuit may include a general-purpose or special-purpose processor, or logic circuit (e.g., binary logic, and multi-level or non-binary logic), to name just a few examples. The operations may also optionally be performed by a combination of hardware and software. An execution unit and/or a processor may include specific or particular circuitry or other logic that is responsive to a machine instruction, or one or more control signals derived from the machine instruction, to compute and store an instruction specified result operand.

It should be appreciated that in the description above, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the higher order polynomial used in the above examples is a quadratic, while the lower order polynomial is linear, the concepts are also applicable to other combinations of high and low precision function approximations. Also, while the example in FIG. 4 shows details of a math circuit that produces function approximations for reciprocal and reciprocal of a square root, the concepts described above are also applicable to design a math circuit that produces function approximations for other transcendental functions such as exponential, logarithmic, and trigonometric functions. The description is thus to be regarded as illustrative instead of limiting.

What is claimed is:

1. A circuit for computing an estimate of a transcendental function, comprising:
    a lookup table storage circuit having stored therein a plurality of groups of values, each group of values representing a respective coefficient of a first polynomial that estimates the transcendental function to a first precision; and
    a first computing circuit coupled to the lookup table storage circuit to use portions of two groups of values representing two lowest-order coefficients of the first polynomial to evaluate a second polynomial that estimates the transcendental function to a second precision, wherein the second precision is lower than the first precision and the order of the second polynomial is lower than the order of the first polynomial, wherein the first computing circuit comprises:
        an adjustment circuit to adjust the portion of the value representing the lowest-order coefficient that is taken from the lookup table storage circuit into an adjusted lowest-order coefficient of the second polynomial by adding an offset value, and
        a multiply add circuit to use the adjusted lowest-order coefficient and the portion of the value representing the first-order coefficient of the first polynomial to evaluate the second polynomial;
    wherein the circuit uses the lookup table storage circuit to evaluate both the first polynomial and the second polynomial.

2. The circuit of claim 1 further comprising a second computing circuit coupled to the lookup table storage circuit to use a value taken from each of the plurality of groups of values, to evaluate the first polynomial.

3. The circuit of claim 1 wherein the adjustment circuit comprises a further lookup table storage circuit having stored therein a plurality of offset values.

4. The circuit of claim 3 wherein the lookup table storage circuit outputs a value from each group, and the further lookup table circuit outputs the offset value, both in response to an instance of an input operand for the function,
    wherein a first group of bits of the input operand are used as input to the lookup table storage circuit, and a second group of bits of the input operand are used as input to the further lookup table storage circuit.

5. The circuit of claim 4 wherein the first and second group of bits are the same.

6. The circuit of claim 1 wherein the second polynomial has a lower order than the first polynomial.

7. The circuit of claim 6 wherein the second polynomial is linear and the first polynomial is quadratic.

8. A processor device comprising:
    an instruction decoder to receive a first instruction that is to evaluate a transcendental function; and
    an execution unit having first lookup table circuitry that contains a plurality of values representing coefficients of a first polynomial that estimates the transcendental function to a first precision, the execution unit having an adjustment circuit that, in response to a decode of the first instruction, adjusts portions of the values that represent two lowest-order coefficients of the first polynomial and that are output by the first lookup table circuitry by adding an offset, and wherein the execution unit is to use the adjusted portion of the value to evaluate a second polynomial that estimates the transcendental function to a second precision, wherein the second precision is lower than the first precision and the order of the second polynomial is lower than the order of the first polynomial;
    wherein the execution unit uses the lookup table circuitry to evaluate both the first polynomial and the second polynomial.

9. The processor device of claim 8 wherein the instruction decoder is to receive a second instruction that is to evaluate the transcendental function at a higher precision than the first instruction, and wherein the first lookup table circuitry, in response to a decode of the second instruction, outputs the plurality of values representing coefficients of the first polynomial, and the execution unit is to evaluate the first polynomial using the plurality of values output by the first lookup table circuitry.

10. The processor device of claim 9 wherein the execution unit comprises first multiplier adder logic to evaluate the first polynomial, with input from a) the plurality of values representing coefficients of the first polynomial and b) an instance of an input operand of the second instruction,
    and second multiplier adder logic to evaluate the second polynomial, with input from a) the adjusted portion of the value that represents a coefficient of the first polynomial and b) an instance of an input operand of the first instruction.

11. The processor device of claim 8 wherein the adjustment circuit comprises second lookup table circuitry having stored therein a plurality of offset values, and wherein the execution unit comprises multiplier adder logic to evaluate the second polynomial, by adding one of the plurality of offset values to the portion of the value taken from the first lookup table circuitry.

12. The processor device of claim 11 wherein a first group of bits of an input operand of the first instruction are used as input to the first lookup table circuit, and a second group of bits of the input operand are used as input to the second lookup table circuit.

13. The processor device of claim 12 wherein the first and second group of bits are the same.

14. A machine-implemented method for computing an estimate of a transcendental function in a processor device, comprising:
    fetching an instruction that is to estimate a transcendental function;

decoding the instruction and in response accessing a lookup table to obtain a value, wherein the value output by the lookup table represents coefficients of a first polynomial that estimates the transcendental function to a first precision;

adjusting a portion of the the lowest-order coefficient output by the lookup table by adding an offset; and evaluating a second polynomial that estimates the transcendental function to a second precision, using the adjusted value, wherein the second precision is lower than the first precision and the order of the second polynomial is lower than the order of the first polynomial;

wherein the processor device uses the lookup table to evaluate both the first polynomial and the second polynomial; and wherein the offset is selected such that a result of evaluating the second polynomial is substantially the same as a result of the transcendental function as executed by a legacy processor belonging to a different processor family than the processor device.

15. The method of claim 14 wherein adjusting a portion of the value output by the lookup table comprises:

in response to decoding of the low precision instruction, accessing a further lookup table to obtain the offset value, and wherein the lower order polynomial is evaluated using the offset value.

16. The method of claim 15 wherein accessing a further lookup table comprises consulting the further lookup table using the same group of bits of an input operand of the instruction as was used for accessing the lookup table to obtain said value.

17. A computer system comprising:

storage to store software; and a processor device coupled to the storage, the processor device having an instruction set architecture that includes an instruction that is to evaluate a transcendental function, the processor device having a plurality of cores wherein each core of the processor has a math circuit to compute an estimate of the transcendental function, the math circuit includes a) a lookup table storage circuit having stored therein a plurality of groups of values, each group of values representing a respective coefficient of a first polynomial to estimate the transcendental function to a first precision, and b) a computing circuit coupled to the lookup table storage circuit to use values from two groups of values representing two lowest-order coefficients to evaluate a second polynomial that estimates the function to a second precision, wherein the second precision is lower than the first precision and the order of the second polynomial is lower than the order of the first polynomial, wherein the computing circuit comprises:

an adjustment circuit that adjusts a portion of the value representing the lowest-order coefficient that is taken from the lookup table storage circuit into an adjusted lowest-order coefficient of the second polynomial by adding an offset value; and a multiply add circuit that uses the adjusted lowest-order coefficient and a portion of the value representing the first-order coefficient of the first polynomial to evaluate the second polynomial;

wherein the processor device uses the lookup table storage circuit to evaluate both the first polynomial and the second polynomial; and wherein the processor device belongs to a first processor family, and the offset value is selected such that a result of evaluating the second polynomial is substantially the same as a result of the transcendental function as executed by a processor device belonging to a second processor family.

18. The computer system of claim 17 wherein the math circuit is to produce a result of an evaluation of the transcendental function, for said instruction, that is essentially equal, on a per bit basis, to a result produced by a second processor device executing the same instruction.

19. The computer system of claim 17 wherein the adjustment circuit comprises a further lookup table storage circuit having stored therein a plurality of offset values, and wherein the multiply add circuit adds one of the plurality of offset values to the portion of the value taken from the lookup table, when evaluating the second polynomial.

* * * * *